(12) United States Patent
Anzai et al.

(10) Patent No.: US 9,347,561 B2
(45) Date of Patent: May 24, 2016

(54) SEAL STRUCTURE USING METAL GASKET

(75) Inventors: Takanori Anzai, Makinohara (JP); Isao Tanji, Makinohara (JP); Shinya Nakaoka, Makinohara (JP); Shota Toma, Fujisawa (JP); Masaru Ito, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/342,073

(22) PCT Filed: Sep. 6, 2012

(86) PCT No.: PCT/JP2012/072675
§ 371 (c)(1),
(2), (4) Date: Feb. 28, 2014

(87) PCT Pub. No.: WO2013/038975
PCT Pub. Date: Mar. 21, 2013

(65) Prior Publication Data
US 2014/0203523 A1 Jul. 24, 2014

(30) Foreign Application Priority Data

Sep. 13, 2011 (JP) .................. 2011-199234

(51) Int. Cl.
*F02F 11/00* (2006.01)
*F16J 15/08* (2006.01)

(52) U.S. Cl.
CPC .......... *F16J 15/0881* (2013.01); *F16J 15/0818* (2013.01); *F16J 15/0825* (2013.01); *F02F 11/00* (2013.01); *F16J 2015/085* (2013.01); *F16J 2015/0856* (2013.01)

(58) Field of Classification Search
CPC ... F16J 15/0825; F16J 15/0818; F16J 15/061; F16J 15/0881; F16J 2015/0856; F16J 2015/085

USPC ......... 277/591, 592, 594, 595, 596, 598, 590, 277/593
See application file for complete search history.

(56) References Cited

U.S. PATENT DOCUMENTS

| 5,431,418 | A  | * | 7/1995 | Hagiwara et al. ............. 277/592 |
| 6,550,782 | B2 | * | 4/2003 | Okazaki et al. ............... 277/592 |
| 7,059,609 | B1 | * | 6/2006 | Locke et al. .................. 277/593 |
| 2001/0006279 | A1 | * | 7/2001 | Sugimoto et al. ............. 277/595 |

(Continued)

FOREIGN PATENT DOCUMENTS

| EP | 1566582 A1 | 8/2005 |
| JP | S58-162252 U | 10/1983 |

(Continued)

OTHER PUBLICATIONS

Extended European Search Report for Patent Application No. EP 12832655.0 dated May 6, 2015 (3 pages).

*Primary Examiner* — Kristina Fulton
*Assistant Examiner* — Nathan Cumar
(74) *Attorney, Agent, or Firm* — Harness, Dickey & Pierce, P.L.C.

(57) ABSTRACT

A seal structure has a metal gasket arranged between a pair of casings. The metal gasket is provided with a bead portion in an inner peripheral side of a planate outer peripheral portion, and a bent portion in an outer peripheral side. When the metal gasket is pinched by a pair of casings, the bead portion elastically deforms so as to reduce its height and the outer peripheral portion elastically deforms on the basis of the elastic deformation of the bead portion, and comes into contact its outer peripheral end portion with one casing, whereby any gap in which salt water stays is not formed between one casing and the outer peripheral portion, and the bent portion comes into contact with the other casing, whereby any gap in which the salt water stays is not formed between the other casing and the outer peripheral portion.

22 Claims, 4 Drawing Sheets

(56) References Cited

U.S. PATENT DOCUMENTS

| | | | |
|---|---|---|---|
| 2002/0000696 A1* | 1/2002 | Okazaki et al. | 277/592 |
| 2003/0222408 A1* | 12/2003 | Reisel et al. | 277/593 |
| 2003/0230858 A1 | 12/2003 | Matsuki et al. | |
| 2005/0046117 A1 | 3/2005 | Novil et al. | |
| 2005/0285352 A1* | 12/2005 | Ueta et al. | 277/595 |
| 2009/0045590 A1* | 2/2009 | Ueta et al. | 277/595 |
| 2010/0187771 A1 | 7/2010 | Waltenberg et al. | |

FOREIGN PATENT DOCUMENTS

| | | | |
|---|---|---|---|
| JP | S64-6349 U | | 1/1989 |
| JP | S64-22852 U | | 2/1989 |
| JP | H02-4062 U | | 1/1990 |
| JP | 07-224938 A | | 8/1995 |
| JP | 08-270796 A | | 10/1996 |
| JP | 09-303560 A | | 11/1997 |
| JP | 11-241769 A | | 9/1999 |
| JP | 2002-106717 A | | 4/2002 |
| JP | 2003 120813 | * | 4/2003 |
| JP | 2003-120813 A | | 4/2003 |
| JP | 2004-052956 A | | 2/2004 |
| JP | 2008-164156 A | | 7/2008 |
| JP | 2009-156382 A | | 7/2009 |
| JP | 2010-525269 A | | 7/2010 |
| WO | WO-2008-128778 A1 | | 10/2008 |

* cited by examiner

SEAL STRUCTURE USING METAL GASKET

CROSS-REFERENCE TO RELATED APPLICATIONS

This application is a U.S. National Stage Application of International Application No. PCT/JP2012/072675 filed on Sep. 6, 2012, and published in Japanese as WO 2013/038975 A1 on Mar. 21, 2013. This application claims priority to Japanese Application No. 2011-199234 filed Sep. 13, 2011. The disclosures of the above applications are incorporated herein by reference.

BACKGROUND OF THE INVENTION

1. Field of the Invention

The present invention relates to a seal structure using a metal gasket. The seal structure according to the present invention is used, for example, an automobile-related field, or is used in the other fields.

2. Description of the Conventional Art

For example, in the metal gasket for the automobile, in preparation for such a condition that the automobile travels in a seaside area and an area where a snow melting agent is diffused in a cold district, there is a case that a neutral salt spray test is executed as a spec evaluation item. In this case, in the case that a casing in the other end to which the metal gasket is installed is made of an aluminum (including an aluminum alloy, same as above), salt water is piled up in (attached to) a gap between the metal gasket and the casing, and corrosion (gap corrosion) of the aluminum material due to the salt water (difference in an ion concentration) is generated by repeating a dry condition and a wet condition. The metal gasket achieves a seal function on the basis of a reaction force of a portion coming into contact with the casing, however, the seal function is deteriorated in the case that the corrosion portion of the casing passes through a seal line.

The corrosion is generated even in the case that the casing is made of an iron-based material, however, since the aluminum (Al) has a greater ionization tendency than the iron-based material (Fe), the aluminum particularly tends to be corroded.

SUMMARY OF THE INVENTION

Problem to be Solved by the Invention

The present invention is made by taking the above points into consideration, and an object of the present invention is to provide a seal structure using a metal gasket, which is structured such that a gap in which the salt water stays is not formed between the metal gasket and a casing, whereby it is possible to inhibit the corrosion of the casing from being generated by the staying of the salt water and the seal function is maintained over a long term.

Means for Solving the Problem

In order to achieve the object mentioned above, according to a first aspect of the present invention, there is provided a seal structure including a metal gasket which is arranged between a pair of casings, wherein the metal gasket is provided with a planate outer peripheral portion, a bead portion which is formed by rising up from an inner peripheral end portion of the outer peripheral portion, to one side in a gasket thickness direction, and a bent portion which is formed by being bent from an outer peripheral end portion of the outer peripheral portion to the other side in the gasket thickness direction, the bead portion and the bent portion are arranged so that the bead portion is directed to one casing and the bent portion is directed to the other casing in an initial arrangement before the metal gasket is pinched by the pair of casings, the bead portion elastically deforms so as to reduce its height and the outer peripheral portion elastically deforms on the basis of the elastic deformation of the bead portion when the metal gasket is pinched by the pair of casings, an outer peripheral end portion of the outer peripheral portion comes into contact with the one casing at this time, whereby any gap in which salt water stays is not formed between the one casing and the outer peripheral portion, and the bent portion comes into contact with the other casing, whereby any gap in which the salt water stays is not formed between the other casing and the outer peripheral portion.

Further, according to a second aspect of the present invention, there is provided the seal structure described in the first aspect mentioned above, wherein the bent portion is provided with such a structure that one surface in a thickness direction comes into contact with a planer edge portion of the other casing or such a structure that its leading end comes into contact with a planar portion of the other casing when the metal gasket is pinched by the pair of casings.

Further, according to a third aspect of the present invention, there is provided the seal structure described in the first aspect or the second aspect mentioned above, wherein the metal gasket is a laminated type metal gasket in which a rubber layer is attached to a surface of a metal base plate, and the metal base plate is provided with such a structure that the metal base plate does not come into contact with the casing and the rubber layer comes into contact with the casing.

The seal structure according to the present invention having the structure mentioned above is structured such that the metal gasket is installed between a pair of casing, the metal gasket is provided with the planate outer peripheral portion, the bead portion which is formed by rising up from the inner peripheral end portion of the outer peripheral portion, to one side in the gasket thickness direction, and the bent portion which is formed by being bent from the outer peripheral end portion of the outer peripheral portion to the other side in the gasket thickness direction, the bead portion and the bent portion are arranged so that the bead portion is directed to one casing and the bent portion is directed to the other casing in the initial arrangement before pinching. Further, in the case that the metal gasket is pinched in its thickness direction by a pair of casings, the bead portion elastically deforms so as to reduce its height and the outer peripheral portion elastically deforms on the basis of the elastic deformation of the bead portion, the outer peripheral end portion of the outer peripheral portion comes into contact with the one casing at this time, and the bent portion comes into contact with the other casing. As a result, the gap between the one casing and the outer peripheral portion and the gap between the other casing and the outer peripheral portion are occluded on the basis of the contacts, and any externally opened gap in which the salt water stays is not formed here. Therefore, it is possible to inhibit the corrosion of the casing from being generated by the staying of the salt water.

The bent portion is an inclined surface shaped or skirt shaped seal piece which is integrally formed in the outer peripheral end portion of the gasket outer peripheral portion. As an aspect that the bent portion mentioned above comes into contact with the other casing, there can be thought an aspect that one surface in a thickness direction of the bent portion comes into contact with the planar edge portion of the other casing, and an aspect that a leading end of the bent portion comes into contact with the planar portion of the other casing.

Effect of the Invention

The present invention achieves the following effects.

In other words, according to the present invention provided with the structure mentioned above, since the gap in which the salt water stays is not formed between the one casing and the outer peripheral portion, and between the other casing and the outer peripheral portion, respectively, it is possible to inhibit the corrosion of the casing from being generated due to the staying of the salt water. Therefore, it is possible to maintain the seal function by the metal gasket over a long term. Further, since the gap in which the salt water stays is not formed in both surfaces of the metal gasket in the thickness direction in spite of one sheet specification of the metal gasket, it is possible to provide the seal structure which is compact and inexpensive.

DETAILED DESCRIPTION OF PREFERRED EMBODIMENTS

The following embodiments are included in the present invention.

(1) The reduction of the seal function due to the corrosion in the salt water spray test is prolonged by preventing the salt water from being attached to the gap between the gasket and the outer peripheral portion of the casing.

(2) The stainless steel, the galvanized steel sheet and the aluminum laminated sheet are used as the gasket base material.

(3) The rubber compound forming the gasket rubber is a synthetic rubber sheet which includes at least one of the nitrile rubber, the styrene butadiene rubber, the fluorine-contained rubber, the acrylic rubber and the silicone rubber.

(4) For the purpose of reducing the corrosion of the aluminum casing by the salt water, further delaying the loss of the gasket seal function due to the progress of the corrosion, and providing the inexpensive gasket in correspondence to two sheet lamination, the bent portion for preventing the salt water intrusion is provided in the outer peripheral side of the product, and the gap between the casing and the gasket is omitted or made smaller than the current one.

(5) According to the structures in the items (1) to (4), the salt water is hard to stay (be attached) by omitting the gap or making the gap small, and it is possible to delay the corrosion progress. Therefore, it is possible to delay the gasket seal function lost by the salt water on the basis of the one sheet specification.

Embodiments

Next, a description will be given of embodiments according to the present invention with reference to the accompanying drawings.

First Embodiment

Figure 1A:
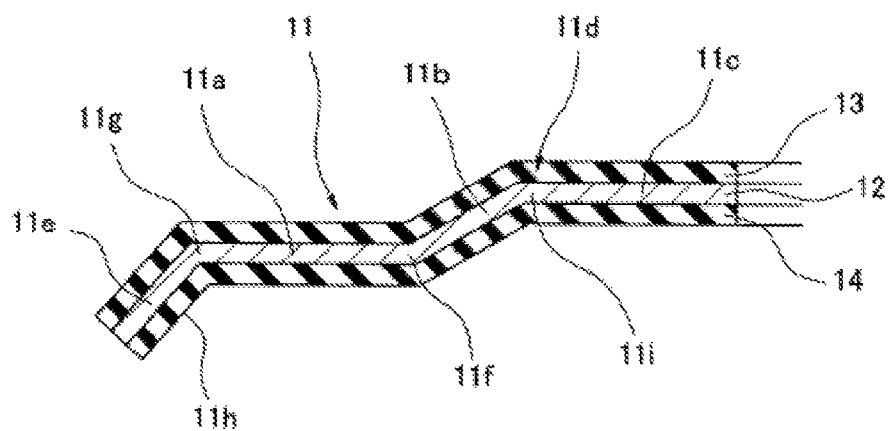
FIG. 1A is a cross sectional view of a substantial part of a metal gasket which is used in a seal structure according to a first embodiment of the present invention.
Figure 1B:
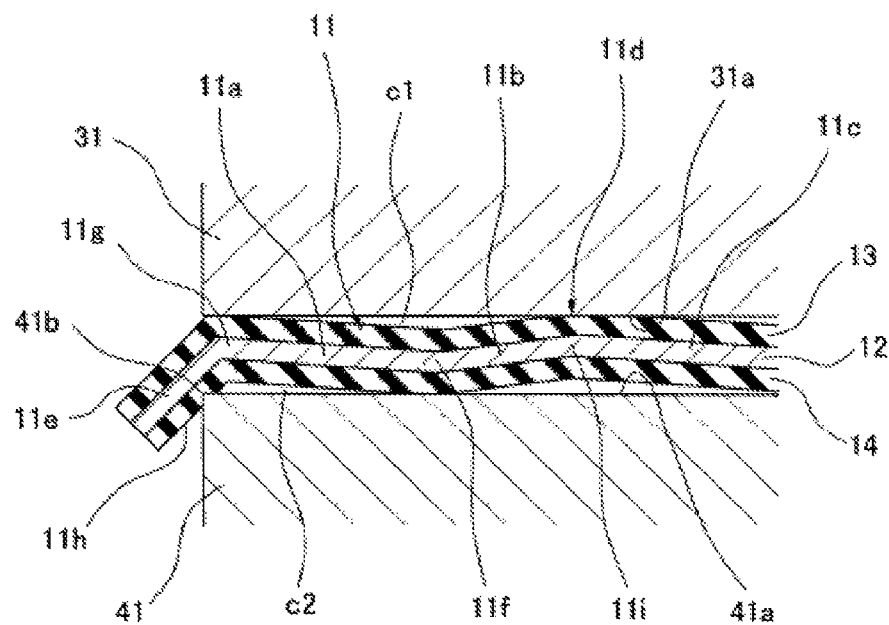
FIG. 1B is a cross sectional view of a substantial part and shows a fastened state of the seal structure.

FIG. 1A shows a cross section of a substantial part of a metal gasket 11 which is used in a seal structure according to a first embodiment of the present invention. In the case that the metal gasket 11 is arranged between a pair of casings (housings or flanges) 31 and 41 and is pinched (fastened by bolts) in a gasket thickness direction (a vertical direction in the drawing), the metal gasket 11 comes to a fastened state shown in FIG. 1B. A left side of each of the drawings is an outer side (an outer peripheral side) of the gasket 11, that is, a sealed fluid side such as salt water, and a right side is an inner side (an inner peripheral side) of the gasket 11. Further, as shown in FIG. 1B, a pair of casings 31 and 41 are constructed by a combination of one casing 31 in an upper side of the drawing and the other casing 41 in a lower side of the drawing, and are structured such that the metal gasket 11 is installed between planar portions 31a and 41a which are opposed to each other. The casings 31 and 41 are made of an aluminum which tends to be corroded by the salt water, however, may be made of an iron-based material or the other materials. One metal gasket 11 is installed between the casings 31 and 41.

As shown in FIG. 1A, the metal gasket 11 is integrally provided with a planate outer peripheral portion 11a, a bead portion 11d which is formed so as to rise up from an inner peripheral end portion (a right end portion in the drawing) of the outer peripheral portion 11a toward one side (an upward direction in the drawing) in a gasket thickness direction, and a bent portion 11e which is formed so as to be bent from an outer peripheral end portion (a left end portion in the drawing) of the outer peripheral portion 11a toward the other side (a downward direction in the drawing) in the gasket thickness direction.

In other words, the metal gasket 11 is provided with the planate outer peripheral portion 11a, an inclined surface portion 11b is integrally formed from the inner peripheral end portion of the outer peripheral portion 11a toward a diagonally upper side, and a planate inner peripheral portion 11c is integrally formed in an inner peripheral end portion of the inclined surface portion 11b. Accordingly, the bead portion 11d having a half bead shape and constructed by combination of the inclined surface portion 11b and the inner peripheral portion 11c is set while having the planate outer peripheral portion 11a as a gasket base plate portion. On the other hand, the bent portion 11e is integrally formed as an inclined surface shape or a skirt shape from an outer peripheral end portion of the outer peripheral portion 11a toward a diagonally downward side.

Further, the metal gasket 11 is provided with a metal base plate (a steel sheet layer) 12, and rubber layers (surface rubber layers) 13 and 14 are attached over a whole surface to both surfaces in a thickness direction of the metal base plate 12. Therefore, the metal gasket 11 is formed as a laminated type metal gasket (a rubber coating metal gasket) which is structured such that the rubber layers 13 and 14 are attached to the surface of the metal base plate and is constructed by a combination of the metal base plate 12 and the rubber layers 13 and 14.

The metal gasket 11 having the structure mentioned above is arranged so that the bead portion 11$d$ is directed to one casing 31 and the bent portion 11$e$ is directed to the other casing 41 in an initial arrangement before the metal gasket is pinched by a pair of casings 31 and 41, comes to a fastened state shown in FIG. 1B in the case that the metal gasket is thereafter pinched by a pair of casings 31 and 41 in a gasket thickness direction. In other words, in this fastened state, the bead portion 11$d$ formed as the half bead shape elastically deforms so as to reduce its height, and the planate outer peripheral portion 11$a$ elastically deforms diagonally on the basis of the elastic deformation. At this time, in the outer peripheral portion 11$a$, its outer peripheral end portion (a corner portion between the outer peripheral portion 11$a$ and the bent portion 11$e$) 11$g$ jumps upward while setting a corner portion 11$f$ between the outer peripheral portion 11$a$ and the bead portion 11$d$ to a supporting point of a lever action, and the outer peripheral end portion 11$g$ comes into contact with a lower surface (a planar portion) 31$a$ of one casing 31 in an upper side by the upper surface rubber layer 13. Further, the bent portion 11$e$ comes into contact with the other casing 41 in a lower side, that is, the bent portion 11$e$ is set to a state in which a part (most part) of the bent portion 11$e$ protrudes to an outer side from between a pair of casings 31 and 41, and one surface 11$h$ in its thickness direction comes into contact with an upper surface corner portion (a planar edge portion) 41$b$ of the other casing 41 by a lower surface rubber layer 14. Therefore, a gap c1 between one casing 31 and the outer peripheral portion 11$a$ and a gap c2 between the other casing 41 and the outer peripheral portion 11$a$ are respectively occluded by the contact mentioned above, and any externally opened gap in which the salt water stays is not formed here. Therefore, it is possible to inhibit the corrosion from being generated in the casings 31 and 41 due to the staying of the salt water.

Since the metal gasket 11 is obtained by integrally forming the half bead shaped bead portion 11$d$ which is constructed by the combination of the inclined surface portion 11$b$ and the inner peripheral portion 11$c$, in the inner side of the planate outer peripheral portion 11$a$, and integrally forming the bent portion 11$e$ in the outer side of the outer peripheral portion 11$a$ as mentioned above, each of a corner portion 11$i$ of the bead portion 11$d$ and the outer peripheral end portion 11$g$ of the outer peripheral portion 11$a$ comes into close contact with the lower surface 31$a$ of one casing 31 in the upper side by the upper surface rubber layer 13, a corner portion 11$f$ between the outer peripheral portion 11$a$ and the bead portion 11$d$ comes into close contact with the upper surface (the planar portion) 41$a$ of the other casing 41 in the lower side by the lower surface rubber layer 14, and the bent portion 11$e$ comes into close contact with the upper surface corner portion 41$b$ of the other casing 41 in the lower side by the lower surface rubber layer 14, as shown in FIG. 1B, on the basis of the fastening of the metal gasket. Therefore, two seal lines are set in each of both surfaces in the thickness direction of the metal gasket 11.

Second Embodiment

In the first embodiment mentioned above, the bead portion 11$d$ provided in the metal gasket 11 is formed as the half bead shape constructed by the combination of the inclined surface portion 11$b$ and the inner peripheral portion 11$c$, however, the shape of the bead portion 11$d$ is not particularly limited, but may be formed as a full bead shape, for example, having a circular arc shape in a cross section or a trapezoidal shape in a cross section. A description will be given below of its example.

Figure 2A:
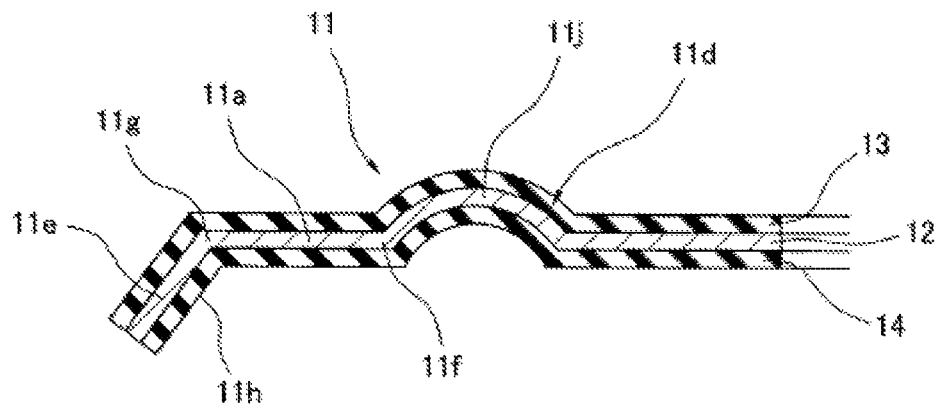
FIG. 2A is a cross sectional view of a substantial part of a metal gasket which is used in a seal structure according to a second embodiment of the present invention.
Figure 2B:
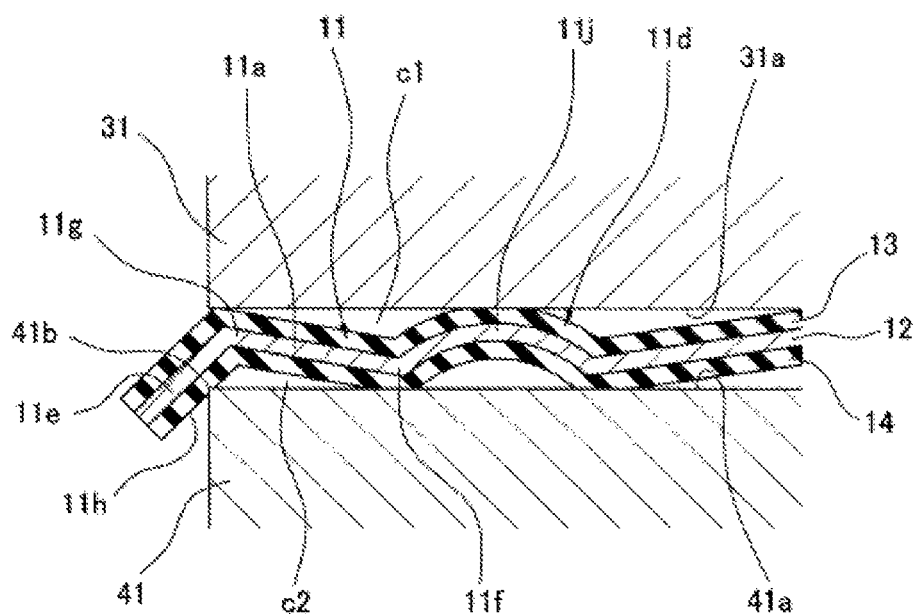
FIG. 2B is a cross sectional view of a substantial part and shows a fastened state of the seal structure.

FIG. 2A shows a cross section of a substantial part of a metal gasket 11 which is used in a seal structure according to a second embodiment of the present invention. In the case that the metal gasket 11 is arranged between a pair of casings (housings or flanges) 31 and 41 and is pinched (fastened by bolts) in a gasket thickness direction (a vertical direction in the drawing), the metal gasket 11 comes to a fastened state shown in FIG. 2B. A left side of each of the drawings is an outer side (an outer peripheral side) of the gasket 11, that is, a sealed fluid side such as salt water, and a right side is an inner side (an inner peripheral side) of the gasket 11. Further, as shown in FIG. 2B, a pair of casings 31 and 41 are constructed by a combination of one casing 31 in an upper side of the drawing and the other casing 41 in a lower side of the drawing, and are structured such that the metal gasket 11 is installed between planar portions 31$a$ and 41$a$ which are opposed to each other. The casings 31 and 41 are made of an aluminum which tends to be corroded by the salt water, however, may be made of an iron-based material or the other materials. One metal gasket 11 is installed between the casings 31 and 41.

As shown in FIG. 2A, the metal gasket 11 is integrally provided with a planate outer peripheral portion 11$a$, a bead portion 11$d$ which is formed so as to rise up from an inner peripheral end portion (a right end portion in the drawing) of the outer peripheral portion 11$a$ toward one side (an upward direction in the drawing) in a gasket thickness direction, and a bent portion 11$e$ which is formed so as to be bent from an outer peripheral end portion (a left end portion in the drawing) of the outer peripheral portion 11$a$ toward the other side (a downward direction in the drawing) in the gasket thickness direction.

In other words, the metal gasket 11 is provided with the planate outer peripheral portion 11$a$, and a full bed shaped bead portion 11$d$ having a circular arc shape in a cross section is integrally formed in an inner peripheral end portion of the outer peripheral portion 11$a$ while setting the outer peripheral portion 11$a$ to a gasket base plate. On the other hand, the bent portion 11$e$ is integrally formed as an inclined surface shape or a skirt shape from an outer peripheral end portion of the outer peripheral portion 11$a$ toward a diagonally downward side.

Further, the metal gasket 11 is provided with a metal base plate (a steel sheet layer) 12, and rubber layers (surface rubber layers) 13 and 14 are attached over a whole surface to both surfaces in a thickness direction of the metal base plate 12. Therefore, the metal gasket 11 is formed as a laminated type metal gasket (a rubber coating metal gasket) which is structured such that the rubber layers 13 and 14 are attached to the surface of the metal base plate and is constructed by a combination of the metal base plate 12 and the rubber layers 13 and 14.

The metal gasket 11 having the structure mentioned above is arranged so that the bead portion 11$d$ is directed to one casing 31 and the bent portion 11$e$ is directed to the other casing 41 in an initial arrangement before the metal gasket is pinched by a pair of casings 31 and 41, comes to a fastened state shown in FIG. 2B in the case that the metal gasket is thereafter pinched by a pair of casings 31 and 41 in a gasket thickness direction. In other words, in this fastened state, the bead portion 11d formed as the full bead shape having the circular arc shape in its cross section elastically deforms so as to reduce its height, and the planate outer peripheral portion 11a elastically deforms diagonally on the basis of the elastic deformation. At this time, in the outer peripheral portion 11a, its outer peripheral end portion (a corner portion between the outer peripheral portion 11a and the bent portion 11e) 11g jumps upward while setting a corner portion 11f between the outer peripheral portion 11a and the bead portion 11d to a supporting point of a lever action, and the outer peripheral end portion 11g comes into contact with a lower surface (a planar portion) 31a of one casing 31 in an upper side by the upper surface rubber layer 13. Further, the bent portion 11e comes into contact with the other casing 41 in a lower side, that is, the bent portion 11e is set to a state in which a part (most part) of the bent portion 11e protrudes to an outer side from between a pair of casings 31 and 41, and one surface 11h in its thickness direction comes into contact with an upper surface corner portion (a planar edge portion) 41b of the other casing 41 by a lower surface rubber layer 14. Therefore, a gap c1 between one casing 31 and the outer peripheral portion 11a and a gap c2 between the other casing 41 and the outer peripheral portion 11a are respectively occluded by the contact mentioned above, and any externally opened gap in which the salt water stays is not formed here. Therefore, it is possible to inhibit the corrosion from being generated in the casings 31 and 41 due to the staying of the salt water.

Since the metal gasket 11 is obtained by integrally forming the full bead shaped bead portion 11d which is formed as the circular arc shape in its cross section, in the inner side of the planate outer peripheral portion 11a, and integrally forming the bent portion 11e in the outer side of the outer peripheral portion 11a as mentioned above, each of a top portion 11j of the bead portion 11d and the outer peripheral end portion 11g of the outer peripheral portion 11a comes into close contact with the lower surface 31a of one casing 31 in the upper side by the upper surface rubber layer 13, a corner portion 11f between the outer peripheral portion 11a and the bead portion 11d comes into close contact with the upper surface (the planar portion) 41a of the other casing 41 in the lower side by the lower surface rubber layer 14, and the bent portion 11e comes into close contact with the upper surface corner portion 41b of the other casing 41 in the lower side by the lower surface rubber layer 14, as shown in FIG. 2B, on the basis of the fastening of the metal gasket. Therefore, two seal lines are set in each of both surfaces in the thickness direction of the metal gasket 11.

Third Embodiment

In the first embodiment mentioned above, the metal gasket 11 is structured such that one surface 11h in the thickness direction of the bent portion 11e comes into contact with the upper surface corner portion (the planar edge portion) 41b of the other casing, however, may be structured such that a leading end 11k of the bent portion 11e comes into contact with the upper surface (the planar portion) 41a of the other casing in place of this. A description will be given below of its example.

Figure 3A:
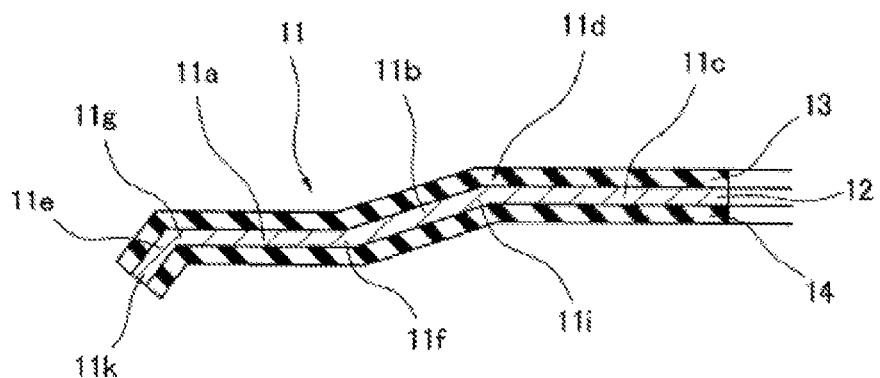
FIG. 3A is a cross sectional view of a substantial part of a metal gasket which is used in a seal structure according to a third embodiment of the present invention.
Figure 3B:
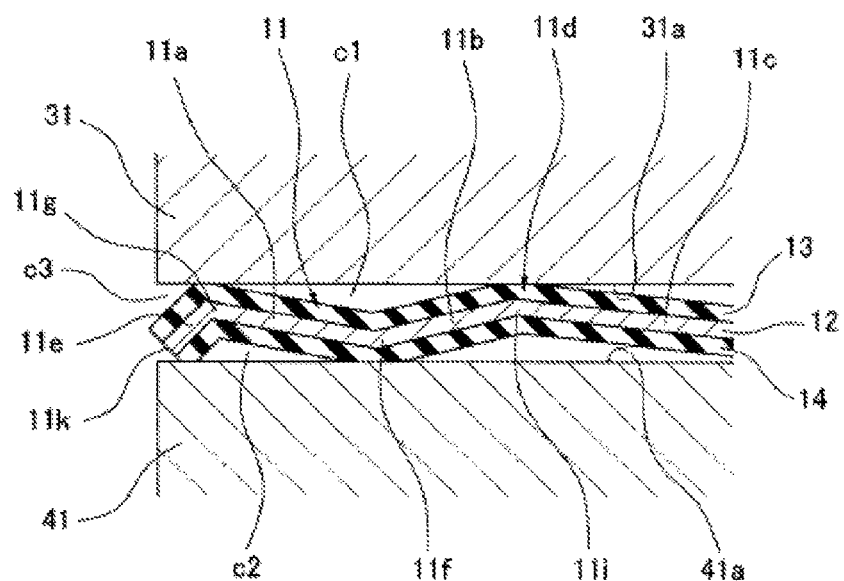
FIG. 3B is a cross sectional view of a substantial part and shows a fastened state of the seal structure.

FIG. 3A shows a cross section of a substantial part of a metal gasket 11 which is used in a seal structure according to a third embodiment of the present invention. In the case that the metal gasket 11 is arranged between a pair of casings (housings or flanges) 31 and 41 and is pinched (fastened by bolts) in a gasket thickness direction (a vertical direction in the drawing), the metal gasket 11 comes to a fastened state shown in FIG. 3B. A left side of each of the drawings is an outer side (an outer peripheral side) of the gasket 11, that is, a sealed fluid side such as salt water, and a right side is an inner side (an inner peripheral side) of the gasket 11. Further, as shown in FIG. 3B, a pair of casings 31 and 41 are constructed by a combination of one casing 31 in an upper side of the drawing and the other casing 41 in a lower side of the drawing, and are structured such that the metal gasket 11 is installed between planar portions 31a and 41a which are opposed to each other. The casings 31 and 41 are made of an aluminum which tends to be corroded by the salt water, however, may be made of an iron-based material or the other materials. One metal gasket 11 is installed between the casings 31 and 41.

As shown in FIG. 3A, the metal gasket 11 is integrally provided with a planate outer peripheral portion 11a, a bead portion 11d which is formed so as to rise up from an inner peripheral end portion (a right end portion in the drawing) of the outer peripheral portion 11a toward one side (an upward direction in the drawing) in a gasket thickness direction, and a bent portion 11e which is formed so as to be bent from an outer peripheral end portion (a left end portion in the drawing) of the outer peripheral portion 11a toward the other side (a downward direction in the drawing) in the gasket thickness direction.

In other words, the metal gasket 11 is provided with the planate outer peripheral portion 11a, an inclined surface portion 11b is integrally formed from the inner peripheral end portion of the outer peripheral portion 11a toward a diagonally upper side, and a planate inner peripheral portion 11c is integrally formed in an inner peripheral end portion of the inclined surface portion 11b. Accordingly, the bead portion 11d having a half bead shape and constructed by combination of the inclined surface portion 11b and the inner peripheral portion 11c is set while having the planate outer peripheral portion 11a as a gasket base plate portion. On the other hand, the bent portion 11e is integrally formed as an inclined surface shape or a skirt shape from an outer peripheral end portion of the outer peripheral portion 11a toward a diagonally downward side. Further, the bent portion 11e is formed so that its length is shorter in comparison with the bent portion 11e according to the first or second embodiment.

Further, the metal gasket 11 is provided with a metal base plate (a steel sheet layer) 12, and rubber layers (surface rubber layers) 13 and 14 are attached over a whole surface to both surfaces in a thickness direction of the metal base plate 12. Therefore, the metal gasket 11 is formed as a laminated type metal gasket (a rubber coating metal gasket) which is structured such that the rubber layers 13 and 14 are attached to the surface of the metal base plate and is constructed by a combination of the metal base plate 12 and the rubber layers 13 and 14.

The metal gasket 11 having the structure mentioned above is arranged so that the bead portion 11d is directed to one casing 31 and the bent portion 11e is directed to the other casing 41 in an initial arrangement before the metal gasket is pinched by a pair of casings 31 and 41, comes to a fastened state shown in FIG. 3B in the case that the metal gasket is thereafter pinched by a pair of casings 31 and 41 in a gasket thickness direction. In other words, in this fastened state, the bead portion 11d formed as the half bead shape elastically deforms so as to reduce its height, and the planate outer peripheral portion 11a elastically deforms diagonally on the basis of the elastic deformation. At this time, in the outer peripheral portion 11a, its outer peripheral end portion (a corner portion between the outer peripheral portion 11a and the bent portion 11e) 11g jumps upward while setting a corner portion 11f between the outer peripheral portion 11a and the bead portion 11d to a supporting point of a lever action, and the outer peripheral end portion 11g comes into contact with a lower surface (a planar portion) 31a of one casing 31 in an upper side by the upper surface rubber layer 13. Further, the bent portion 11e comes into contact with the other casing 41 in a lower side, that is, the bent portion 11e is set to a state in which a most part of the bent portion 11e is arranged between a pair of casings 31 and 41, and its leading end (an outer peripheral end portion) 11k comes into contact with an upper surface (a planar portion) 41a of the other casing 41 by a lower surface rubber layer 14. Therefore, a gap c1 between one casing 31 and the outer peripheral portion 11a and a gap c2 between the other casing 41 and the outer peripheral portion 11a are respectively occluded by the contact mentioned above, and any externally opened gap in which the salt water stays is not formed here. Therefore, it is possible to inhibit the corrosion from being generated in the casings 31 and 41 due to the staying of the salt water.

Since the metal gasket 11 is obtained by integrally forming the half bead shaped bead portion 11d which is constructed by the combination of the inclined surface portion 11b and the inner peripheral portion 11c, in the inner side of the planate outer peripheral portion 11a, and integrally forming the bent portion 11e in the outer side of the outer peripheral portion 11a as mentioned above, each of a corner portion 11i of the bead portion 11d and the outer peripheral end portion 11g of the outer peripheral portion 11a comes into close contact with the lower surface 31a of one casing 31 in the upper side by the upper surface rubber layer 13, and each of a corner portion 11f between the outer peripheral portion 11a and the bead portion 11d and the leading end 11k of the bent portion 11e comes into close contact with the upper surface (the planar portion) 41a of the other casing 41 in the lower side by the lower surface rubber layer 14, as shown in FIG. 3B, on the basis of the fastening of the metal gasket. Therefore, two seal lines are set in each of both surfaces in the thickness direction of the metal gasket 11.

Further, according to the third embodiment, since an externally opened gap c3 is formed newly between one casing 31 and the bent portion 11e, the salt water has a chance of staying here, however, the gap c3 between one casing 31 and the bent portion 11e is extremely smaller in its volumetric capacity in comparison with the gap c1 between one casing 31 and the outer peripheral portion 11a or the gap c2 between the other casing 41 and the outer peripheral portion 11a. Therefore, it is possible to inhibit the corrosion from being generated in such a range that the volumetric capacity of the gap is reduced.

Fourth Embodiment

The second embodiment and the third embodiment can be combined. A description will be given below of an example.

Figure 4A:
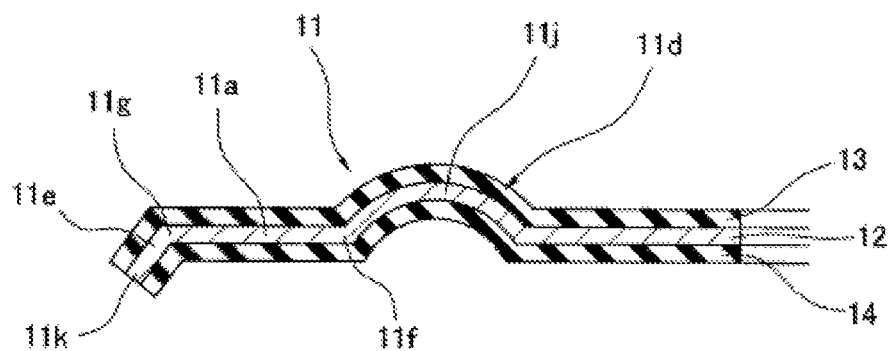
FIG. 4A is a cross sectional view of a substantial part of a metal gasket which is used in a seal structure according to a fourth embodiment of the present invention.
Figure 4B:
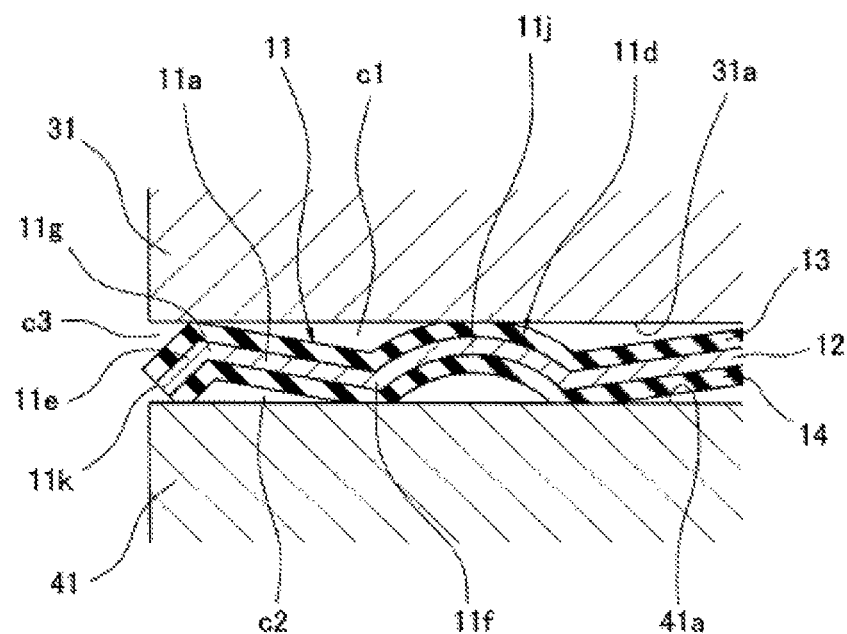
FIG. 4B is a cross sectional view of a substantial part and shows a fastened state of the seal structure.

FIG. 4A shows a cross section of a substantial part of a metal gasket 11 which is used in a seal structure according to a fourth embodiment of the present invention. In the case that the metal gasket 11 is arranged between a pair of casings (housings or flanges) 31 and 41 and is pinched (fastened by bolts) in a gasket thickness direction (a vertical direction in the drawing), the metal gasket 11 comes to a fastened state shown in FIG. 4B. A left side of each of the drawings is an outer side (an outer peripheral side) of the gasket 11, that is, a sealed fluid side such as salt water, and a right side is an inner side (an inner peripheral side) of the gasket 11. Further, as shown in FIG. 4B, a pair of casings 31 and 41 are constructed by a combination of one casing 31 in an upper side of the drawing and the other casing 41 in a lower side of the drawing, and are structured such that the metal gasket 11 is installed between planar portions 31a and 41a which are opposed to each other. The casings 31 and 41 are made of an aluminum which tends to be corroded by the salt water, however, may be made of an iron-based material or the other materials. One metal gasket 11 is installed between the casings 31 and 41.

As shown in FIG. 4A, the metal gasket 11 is integrally provided with a planate outer peripheral portion 11a, a bead portion 11d which is formed so as to rise up from an inner peripheral end portion (a right end portion in the drawing) of the outer peripheral portion 11a toward one side (an upward direction in the drawing) in a gasket thickness direction, and a bent portion 11e which is formed so as to be bent from an outer peripheral end portion (a left end portion in the drawing) of the outer peripheral portion 11a toward the other side (a downward direction in the drawing) in the gasket thickness direction.

In other words, the metal gasket 11 is provided with the planate outer peripheral portion 11a, and a full bed shaped bead portion 11d having a circular arc shape in a cross section is integrally formed in an inner peripheral end portion of the outer peripheral portion 11a while setting the outer peripheral portion 11a to a gasket base plate. On the other hand, the bent portion 11e is integrally formed as an inclined surface shape or a skirt shape from an outer peripheral end portion of the outer peripheral portion 11a toward a diagonally downward side. Further, the bent portion 11e is formed so that its length is shorter in comparison with the bent portion 11e according to the first or second embodiment.

Further, the metal gasket 11 is provided with a metal base plate (a steel sheet layer) 12, and rubber layers (surface rubber layers) 13 and 14 are attached over a whole surface to both surfaces in a thickness direction of the metal base plate 12. Therefore, the metal gasket 11 is formed as a laminated type metal gasket (a rubber coating metal gasket) which is structured such that the rubber layers 13 and 14 are attached to the surface of the metal base plate and is constructed by a combination of the metal base plate 12 and the rubber layers 13 and 14.

The metal gasket 11 having the structure mentioned above is arranged so that the bead portion 11d is directed to one casing 31 and the bent portion 11e is directed to the other casing 41 in an initial arrangement before the metal gasket is pinched by a pair of casings 31 and 41, comes to a fastened state shown in FIG. 4B in the case that the metal gasket is thereafter pinched by a pair of casings 31 and 41 in a gasket thickness direction. In other words, in this fastened state, the bead portion 11d formed as the full bead shape having the circular arc shape in its cross section elastically deforms so as to reduce its height, and the planate outer peripheral portion 11a elastically deforms diagonally on the basis of the elastic deformation. At this time, in the outer peripheral portion 11a, its outer peripheral end portion (a corner portion between the outer peripheral portion 11a and the bent portion 11e) 11g jumps upward while setting a corner portion 11f between the outer peripheral portion 11a and the bead portion 11d to a supporting point of a lever action, and the outer peripheral end portion 11g comes into contact with a lower surface (a planar portion) 31a of one casing 31 in an upper side by the upper surface rubber layer 13. Further, the bent portion 11e comes into contact with the other casing 41 in a lower side, that is, the bent portion 11e is set to a state in which a most part of the bent portion 11e is arranged between a pair of casings 31 and 41, and its leading end (an outer peripheral end portion) 11k comes into contact with an upper surface (a planar portion) 41a of the other casing 41 by a lower surface rubber layer 14. Therefore, a gap c1 between one casing 31 and the outer peripheral portion 11a and a gap c2 between the other casing 41 and the outer peripheral portion 11a are respectively occluded by the contact mentioned above, and any externally opened gap in which the salt water stays is not formed here. Therefore, it is possible to inhibit the corrosion from being generated in the casings 31 and 41 due to the staying of the salt water.

Since the metal gasket 11 is obtained by integrally forming the full bead shaped bead portion 11d which is formed as the circular arc shape in its cross section, in the inner side of the planate outer peripheral portion 11a, and integrally forming the bent portion 11e in the outer side of the outer peripheral portion 11a as mentioned above, each of a top portion 11j of the bead portion 11d and the outer peripheral end portion 11g of the outer peripheral portion 11a comes into close contact with the lower surface 31a of one casing 31 in the upper side by the upper surface rubber layer 13, and each of a corner portion 11f between the outer peripheral portion 11a and the bead portion 11d and the leading end 11k of the bent portion 11e comes into close contact with the upper surface (the planar portion) 41a of the other casing 41 in the lower side by the lower surface rubber layer 14, and the bent portion 11e comes into close contact with the upper surface corner portion 41b of the other casing 41 in the lower side by the lower surface rubber layer 14, as shown in FIG. 4B, on the basis of the fastening of the metal gasket. Therefore, two seal lines are set in each of both surfaces in the thickness direction of the metal gasket 11.

Further, according to the fourth embodiment, since an externally opened gap c3 is formed newly between one casing 31 and the bent portion 11e, the salt water has a chance of staying here, however, the gap c3 between one casing 31 and the bent portion 11e is extremely smaller in its volumetric capacity in comparison with the gap c1 between one casing 31 and the outer peripheral portion 11a or the gap c2 between the other casing 41 and the outer peripheral portion 11a. Therefore, it is possible to inhibit the corrosion from being generated in such a range that the volumetric capacity of the gap is reduced.

What is claimed is:

1. A seal structure comprising a metal gasket which is arranged between a pair of casings,
    wherein said metal gasket includes:
        a planate outer peripheral portion having an inner peripheral end and an outer peripheral end,
        a bead portion extending upwardly from said inner peripheral end, and
        a bent portion, an entirety of said bent portion continuously extending from said outer peripheral end of said planate outer peripheral portion at a slant diagonally downwardly to a free distal end, said bent portion terminating at said free distal end,
    wherein said bead portion is directed to one of said pair of casings and said bent portion is directed to the other of said pair of casings in an initial arrangement before said metal gasket is pinched by said pair of casings, and
    wherein, when said metal gasket is pinched by said pair of casings:
        said bead portion is configured to elastically deform so as to exhibit height reduction,
        said planate outer peripheral portion is configured to elastically deform due to the elastic deformation of said bead portion,
        an outer peripheral end portion of said planate outer peripheral portion is configured to come into contact with said one of said pair of casings, and
        said bent portion is configured to come into contact with said other of said pair of casings.

2. The seal structure according to claim 1, wherein said bent portion is configured such that one surface in a thickness direction comes into contact with a planar edge portion of said other casing or such that a leading end thereof comes into contact with a planar portion of said other casing when said metal gasket is pinched by said pair of casings.

3. The seal structure according to claim 1, wherein said metal gasket is a laminated metal gasket having a rubber layer attached to a surface of a metal base plate, and said metal base plate is configured such that the metal base plate does not come into contact with said casing.

4. The seal structure according to claim 2, wherein said metal gasket is a laminated metal gasket having a rubber layer attached to a surface of a metal base plate, and said metal base plate is configured such that the metal base plate does not come into contact with said casing.

5. A seal structure comprising a metal gasket arranged between a pair of casings,
    wherein said metal gasket includes:
        a planate outer peripheral portion having an inner peripheral end and an outer peripheral end,
        a bead extending upwardly from said inner peripheral end, and
        a peripheral skirt, an entirety of said peripheral skirt continuously extending from said outer peripheral end of said planate outer peripheral portion at a slant diagonally downwardly to a free distal end, said peripheral skirt terminating at a-said free distal end,
    wherein said bead portion abuts against one of said pair of casings and said peripheral skirt abuts against the other of said pair of casings, and
    wherein, upon said metal gasket being pinched by said pair of casings:
        the outer peripheral end of said planate outer peripheral portion is configured to come into contact with said one of said pair of casings, and
        said peripheral skirt is configured to come into contact with said other of said pair of casings.

6. The seal structure according to claim 5, wherein said peripheral skirt is configured such that one surface in a thickness direction comes into contact with a planar edge portion of said other casing.

7. The seal structure according to claim 6, wherein said metal gasket is a laminated metal gasket having a rubber layer attached to a surface of a metal base plate, and said metal base plate is configured such that the metal base plate does not come into contact with said casing.

8. The seal structure according to claim 5, wherein said peripheral skirt is configured such that the distal end thereof comes into contact with a planar portion of said other casing when said metal gasket is pinched by said pair of casings.

9. The seal structure according to claim 8, wherein said metal gasket is a laminated metal gasket having a rubber layer attached to a surface of a metal base plate, and said metal base plate is configured such that the metal base plate does not come into contact with said casing.

10. The seal structure according to claim 1, wherein, when said metal gasket is pinched by said pair of casings:
    a first gap is established between the one of said pair of casings and the planate outer peripheral portion;
    a second gap is established between the other of said pair of casings and the planate outer peripheral portion; and
    the first and second gaps are respectively occluded by the contact of the outer peripheral end portion of said planate outer peripheral portion with said one of said pair of casings, and the contact of said bent portion with said other of said pair of casings.

11. The seal structure according to claim 5, wherein, when said metal gasket is pinched by said pair of casings:
 a first gap is established between the one of said pair of casings and the planate outer peripheral portion;
 a second gap is established between the other of said pair of casings and the planate outer peripheral portion; and
 the first and second gaps are respectively occluded by the contact of the outer peripheral end of said planate outer peripheral portion with said one of said pair of casings, and the contact of said peripheral skirt with said other of said pair of casings.

12. A seal structure comprising a metal gasket which is arranged between a pair of casings,
 wherein said metal gasket includes:
  a planate outer peripheral portion having an inner peripheral end and an outer peripheral end,
  a bead portion extending upwardly from said inner peripheral end, and
  a bent portion extending at a slant diagonally downwardly from said outer peripheral end, said bent portion terminating at a free distal end, said bent portion being entirely conically shaped between said outer peripheral end and said free distal end,
 wherein said bead portion is directed to one of said pair of casings and said bent portion is directed to the other of said pair of casings in an initial arrangement before said metal gasket is pinched by said pair of casings, and
 wherein, when said metal gasket is pinched by said pair of casings:
  said bead portion is configured to elastically deform so as to exhibit height reduction,
  said planate outer peripheral portion is configured to elastically deform due to the elastic deformation of said bead portion,
  an outer peripheral end portion of said planate outer peripheral portion is configured to come into contact with said one of said pair of casings, and
  said bent portion is configured to come into contact with said other of said pair of casings.

13. The seal structure according to claim 12, wherein said bent portion is configured such that one surface in a thickness direction comes into contact with a planar edge portion of said other casing or such that a leading end thereof comes into contact with a planar portion of said other casing when said metal gasket is pinched by said pair of casings.

14. The seal structure according to claim 12, wherein said metal gasket is a laminated metal gasket having a rubber layer attached to a surface of a metal base plate, and said metal base plate is configured such that the metal base plate does not come into contact with said casing.

15. The seal structure according to claim 13, wherein said metal gasket is a laminated metal gasket having a rubber layer attached to a surface of a metal base plate, and said metal base plate is configured such that the metal base plate does not come into contact with said casing.

16. The seal structure according to claim 12, wherein, when said metal gasket is pinched by said pair of casings:
 a first gap is established between the one of said pair of casings and the planate outer peripheral portion;
 a second gap is established between the other of said pair of casings and the planate outer peripheral portion; and
 the first and second gaps are respectively occluded by the contact of the outer peripheral end portion of said planate outer peripheral portion with said one of said pair of casings, and the contact of said bent portion with said other of said pair of casings.

17. A seal structure comprising a metal gasket arranged between a pair of casings,
 wherein said metal gasket includes:
  a planate outer peripheral portion having an inner peripheral end and an outer peripheral end,
  a bead extending upwardly from said inner peripheral end, and
  a peripheral skirt extending at a slant diagonally downwardly from said outer peripheral end, said peripheral skirt terminating at a free distal end, said peripheral skirt being entirely conically shaped between said outer peripheral end and said free distal end,
 wherein said bead portion abuts against one of said pair of casings and said peripheral skirt abuts against the other of said pair of casings, and
 wherein, upon said metal gasket being pinched by said pair of casings:
  the outer peripheral end of said planate outer peripheral portion is configured to come into contact with said one of said pair of casings, and
  said peripheral skirt is configured to come into contact with said other of said pair of casings.

18. The seal structure according to claim 17, wherein said peripheral skirt is configured such that one surface in a thickness direction comes into contact with a planar edge portion of said other casing.

19. The seal structure according to claim 18, wherein said metal gasket is a laminated metal gasket having a rubber layer attached to a surface of a metal base plate, and said metal base plate is configured such that the metal base plate does not come into contact with said casing.

20. The seal structure according to claim 17, wherein said peripheral skirt is configured such that the distal end thereof comes into contact with a planar portion of said other casing when said metal gasket is pinched by said pair of casings.

21. The seal structure according to claim 20, wherein said metal gasket is a laminated metal gasket having a rubber layer attached to a surface of a metal base plate, and said metal base plate is configured such that the metal base plate does not come into contact with said casing.

22. The seal structure according to claim 17, wherein, when said metal gasket is pinched by said pair of casings:
 a first gap is established between the one of said pair of casings and the planate outer peripheral portion;
 a second gap is established between the other of said pair of casings and the planate outer peripheral portion; and
 the first and second gaps are respectively occluded by the contact of the outer peripheral end of said planate outer peripheral portion with said one of said pair of casings, and the contact of said peripheral skirt with said other of said pair of casings.

\* \* \* \* \*